(12) United States Patent
Walker

(10) Patent No.: US 10,046,255 B1
(45) Date of Patent: Aug. 14, 2018

(54) DUAL FILTER PUMP ASSEMBLY

(71) Applicant: James R. Walker, Days Creek, OR (US)

(72) Inventor: James R. Walker, Days Creek, OR (US)

(*) Notice: Subject to any disclaimer, the term of this patent is extended or adjusted under 35 U.S.C. 154(b) by 146 days.

(21) Appl. No.: 15/184,870

(22) Filed: Jun. 16, 2016

Related U.S. Application Data

(60) Provisional application No. 62/188,026, filed on Jul. 2, 2015.

(51) Int. Cl.
| | |
|---|---|
| *B01D 35/26* | (2006.01) |
| *F04B 19/22* | (2006.01) |
| *F04B 9/14* | (2006.01) |
| *F04B 17/03* | (2006.01) |
| *F04B 53/14* | (2006.01) |
| *F04B 53/16* | (2006.01) |
| *F04B 53/20* | (2006.01) |
| *B01D 39/20* | (2006.01) |
| *B01D 39/10* | (2006.01) |
| *B01D 39/16* | (2006.01) |
| *B01D 35/02* | (2006.01) |
| *C02F 1/00* | (2006.01) |

(52) U.S. Cl.
CPC ............ *B01D 35/26* (2013.01); *B01D 35/02* (2013.01); *B01D 39/10* (2013.01); *B01D 39/1623* (2013.01); *B01D 39/2068* (2013.01); *F04B 9/14* (2013.01); *F04B 17/03* (2013.01); *F04B 19/22* (2013.01); *F04B 53/144* (2013.01); *F04B 53/16* (2013.01); *F04B 53/20* (2013.01); *B01D 2201/167* (2013.01); *C02F 1/002* (2013.01)

(58) Field of Classification Search
CPC .. B01D 35/26; B01D 2201/167; B01D 30/10; B01D 30/1623; B01D 30/2068; C02F 1/002; C02F 1/003; C02F 9/005; F04B 5/02; F04B 9/14; F04B 19/22; F04B 53/20
See application file for complete search history.

(56) References Cited

U.S. PATENT DOCUMENTS

| | | | |
|---|---|---|---|
| 629,387 A | * | 7/1899 | Nordtmeyer ............ C02F 1/283 210/416.3 |
| 2,670,081 A | | 2/1954 | Quinn |

(Continued)

*Primary Examiner* — Terry K Cecil
(74) *Attorney, Agent, or Firm* — Jerry Haynes Law

(57) ABSTRACT

A dual filter pump assembly provides a portable, typically hand-powered vacuum and pressure pump that alternatively creates a vacuum or negative pressure and positive pressure which force a liquid to be filtered through various passageways and chambers in a base and through a coarse filter medium and a micro filter medium. A lower check valve and an upper check valve maintain synchronized communication between the passageways, such that there is sufficient pressure and flow regulation to force the liquid through microsized pores in the generally flow restrictive micro filter medium. The micro-sized pores may be susceptible to inhibiting the flow of the liquid, and consequently generate pressure build up inside the pump and filter chambers. In some embodiments, a relief valve may help release the excess fluid pressure build up in the pump and filter chambers. The relief valve may additionally provide an indication of when the micro filter medium requires cleaning, such as in the event that some of the liquid exits a relief port in the relief valve.

18 Claims, 8 Drawing Sheets

(56) References Cited

U.S. PATENT DOCUMENTS

| | | | |
|---|---|---|---|
| 4,626,348 A * | 12/1986 | Stone | B01D 27/08 |
| | | | 210/248 |
| 5,019,252 A | 5/1991 | Kamei et al. | |
| 5,106,500 A | 4/1992 | Hembree et al. | |
| 5,120,437 A | 6/1992 | Williams | |
| 5,695,392 A * | 12/1997 | Kim | B24B 37/32 |
| | | | 451/285 |
| 6,334,760 B1 | 1/2002 | Walker | |
| 7,404,894 B2 * | 7/2008 | Yamaguchi | B01D 61/18 |
| | | | 210/232 |
| 7,413,653 B2 | 8/2008 | Powell | |
| 7,438,801 B2 * | 10/2008 | Scaringe | B01D 61/08 |
| | | | 210/137 |
| 8,318,011 B2 | 11/2012 | O'Brian et al. | |
| 9,022,223 B1 | 5/2015 | Wright | |
| 2014/0102973 A1 | 4/2014 | Nagata | |
| 2014/0322051 A1 | 10/2014 | Bartl | |

\* cited by examiner

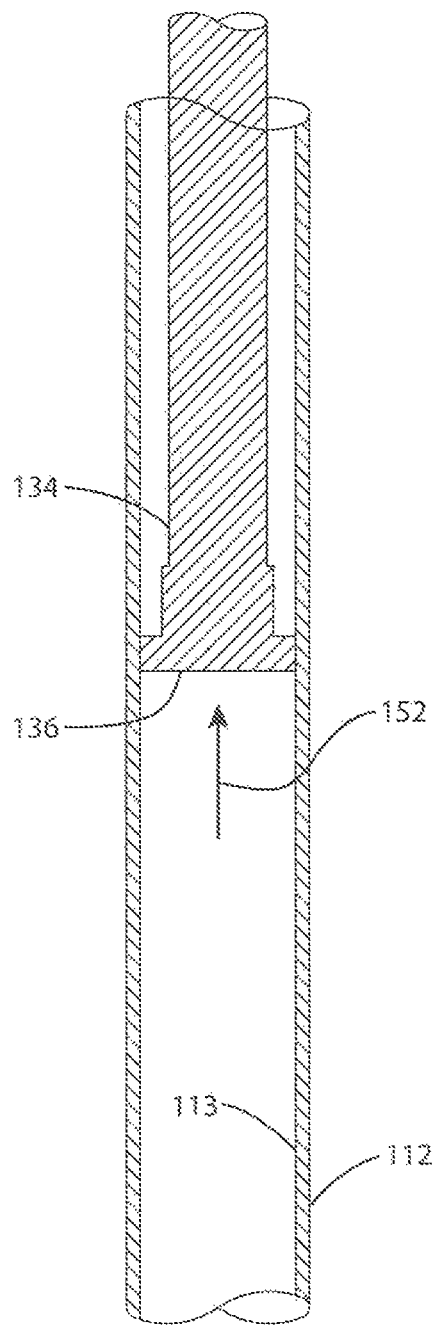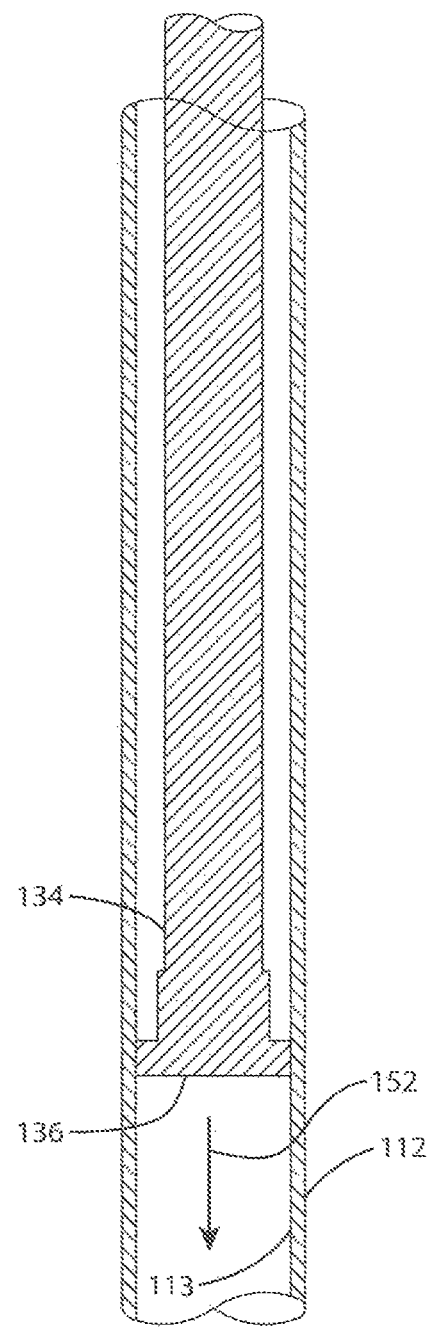

DUAL FILTER PUMP ASSEMBLY

CROSS-REFERENCE TO RELATED APPLICATIONS

This application claims the benefit of U.S. provisional application No. 62/188,026, filed Jul. 2, 2015 and entitled DUAL FILTER PUMP ASSEMBLY, which provisional application is incorporated by reference herein in its entirety.

FIELD OF THE INVENTION

The present invention relates generally to a dual filter pump assembly that draws a liquid through a coarse filter medium and subsequently forcibly pushes the liquid through a micro filter medium to produce potable water. More so, the present invention relates to a dual filter pump assembly which produces potable water by alternatively creating negative and positive fluid pressures to force a liquid through upper, middle, and lower passageways and chambers in a base and through a coarse filter medium and a micro filter medium, and may further include a relief valve to release excess pressure in the assembly and indicate when the micro filter medium requires cleaning.

BRIEF DESCRIPTION OF THE DRAWINGS

The invention will now be described, by way of example, with reference to the accompanying drawings, in which:

FIG. 9 illustrates a sectioned view of the pump chamber and piston rod in the pump chamber, more particularly illustrating withdrawal of the piston rod in the pump chamber to exert negative fluid pressure on the liquid and draw the liquid into the pump chamber;

FIG. 10 illustrates a sectioned view of the pump chamber and piston rod in the pump chamber, more particularly illustrating-retraction of the piston rod into the pump chamber to exert positive fluid pressure on the liquid and force the liquid from the pump chamber.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

Figure 1:
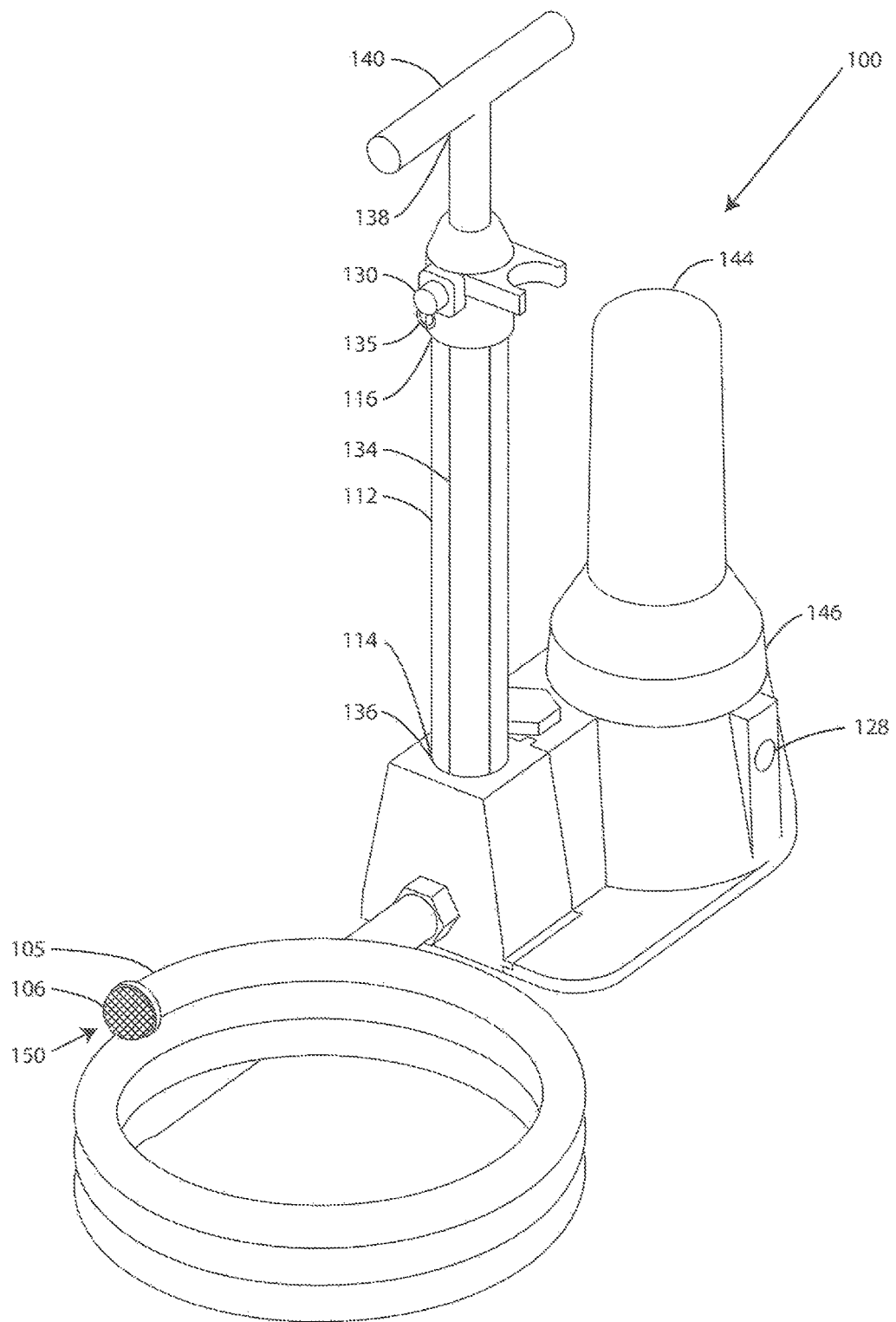
FIG. 1 illustrates a perspective view of an exemplary dual filter pump assembly, in accordance with an embodiment of the present invention.
Figure 2:
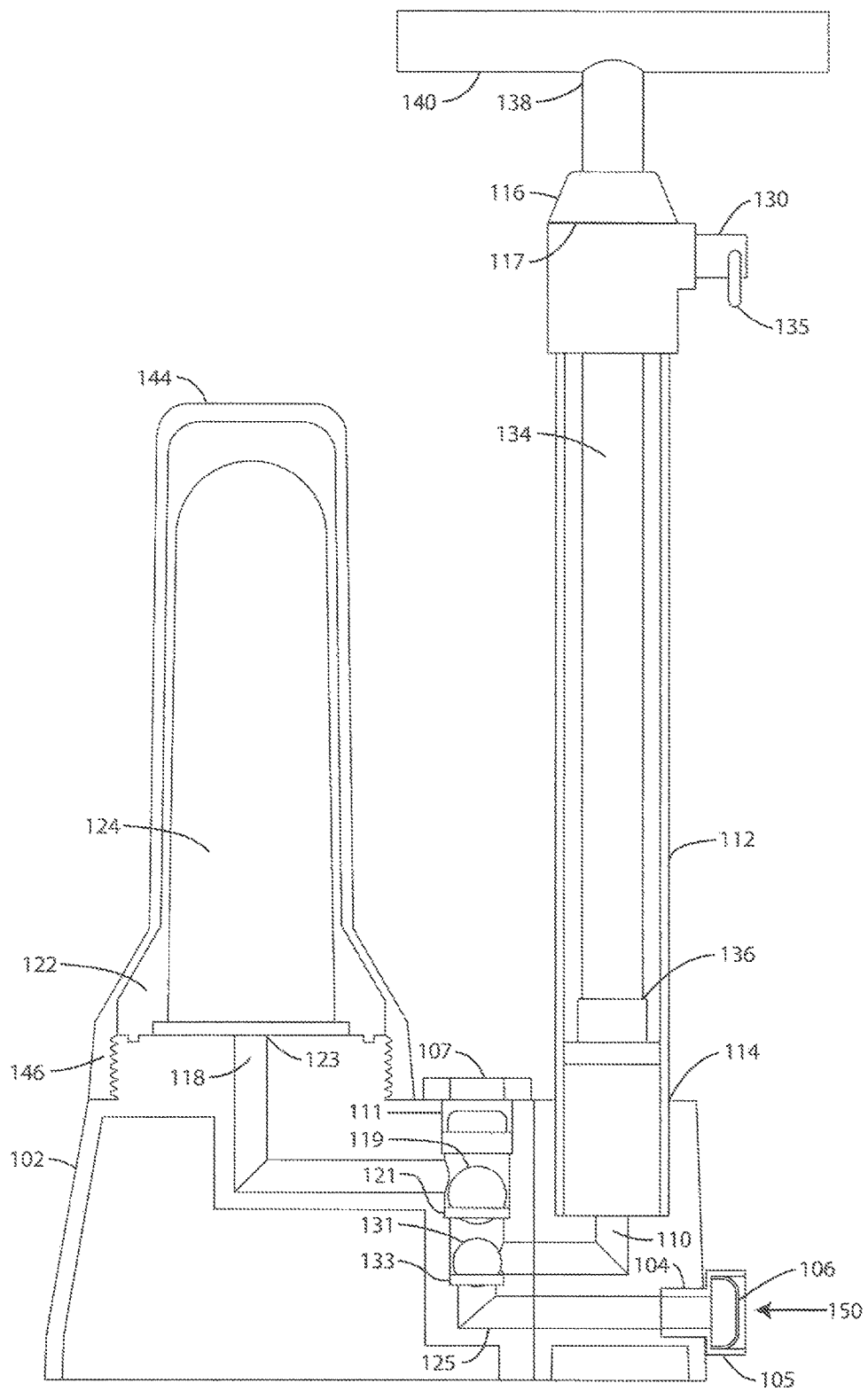
FIG. 2 illustrates a sectioned view of the dual filter pump assembly, in accordance with an embodiment of the present invention.

Referring initially to FIGS. 1-11 of the drawings, an illustrative embodiment of the dual filter pump assembly, hereinafter assembly, is generally indicated by reference numeral 100. The assembly 100 may be especially useful for producing potable water in remote areas where access to electrical power sources is problematic and inexpensive filtering mechanisms are necessary. The assembly 100 can also be used with any pressurized water source below 70 PSI (water hose) As illustrated in FIGS. 1 and 2, the assembly 100 may include a base 102. The base 102 may include an inlet 104. The inlet 104 may be configured for confluent coupling with an inlet conduit 105 according to the knowledge of those skilled in the art. A course filter medium 106 may be provided in the base 102 and disposed in fluid communication with the inlet 104. A lower passageway 125 in the base 102 may be disposed in fluid communication with the course filter medium 106. An upper passageway 118 in the base 102 may be disposed in fluid communication with the lower passageway 125. A middle passageway 110 may be disposed in fluid communication with the lower passageway 125 beneath the upper passageway 118.

Figure 4A:
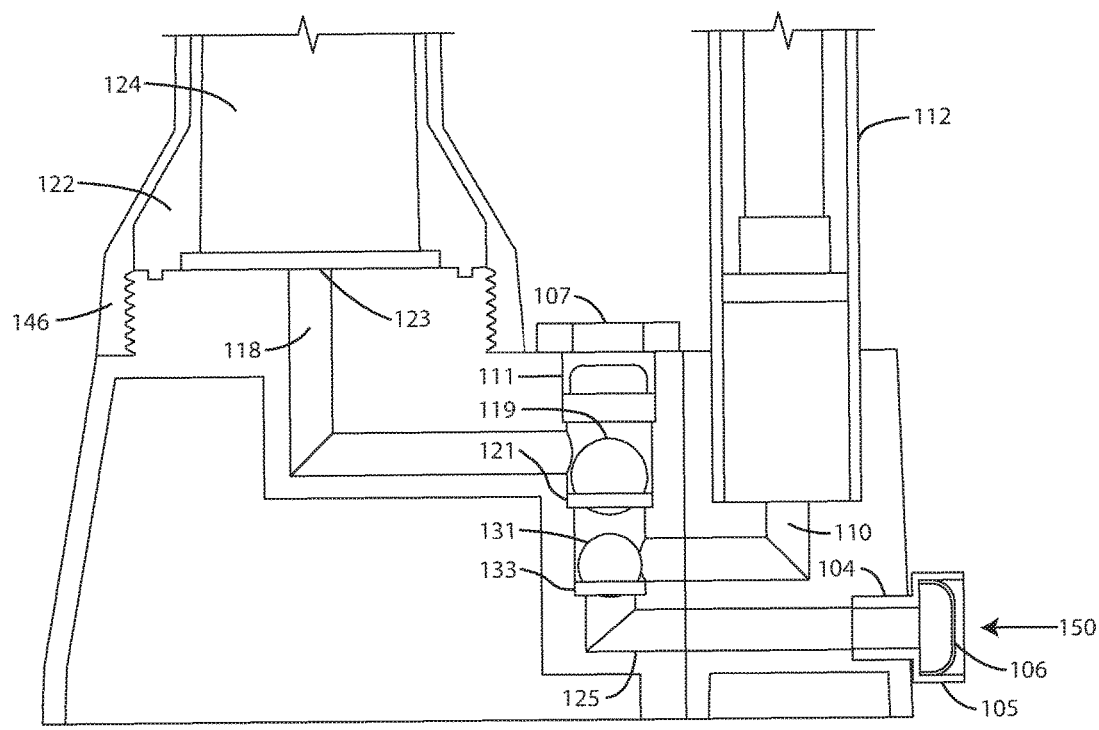
FIG. 4A illustrates a sectioned view of the base, showing an exemplary upper check valve restricting entry to a middle passageway and an exemplary lower check valve enabling entry into a lower passageway in the base in accordance with an embodiment of the present invention.

As illustrated in FIG. 4A, a lower check valve 131 may include a lower valve seat 133 which is provided at the junction between the lower passageway 125 and the middle passageway 110. A lower check valve ball 131 may normally engage the lower valve seat 133 typically by gravity to seal the middle passageway 110 from the lower passageway 125. An upper check valve 119 may include an upper valve seat 121 which is be provided at the junction between the upper passageway 118 and the middle passageway 110, typically above the lower check valve ball 131. An upper check valve ball 119 may normally engage the upper valve seat 121 typically by gravity to seal the upper passageway 118 from the middle passageway 110. The middle passageway 110 may communicate with the lower passageway 125 at a point which is between the lower check valve ball -131 and the upper valve seat 121.

Figure 3:
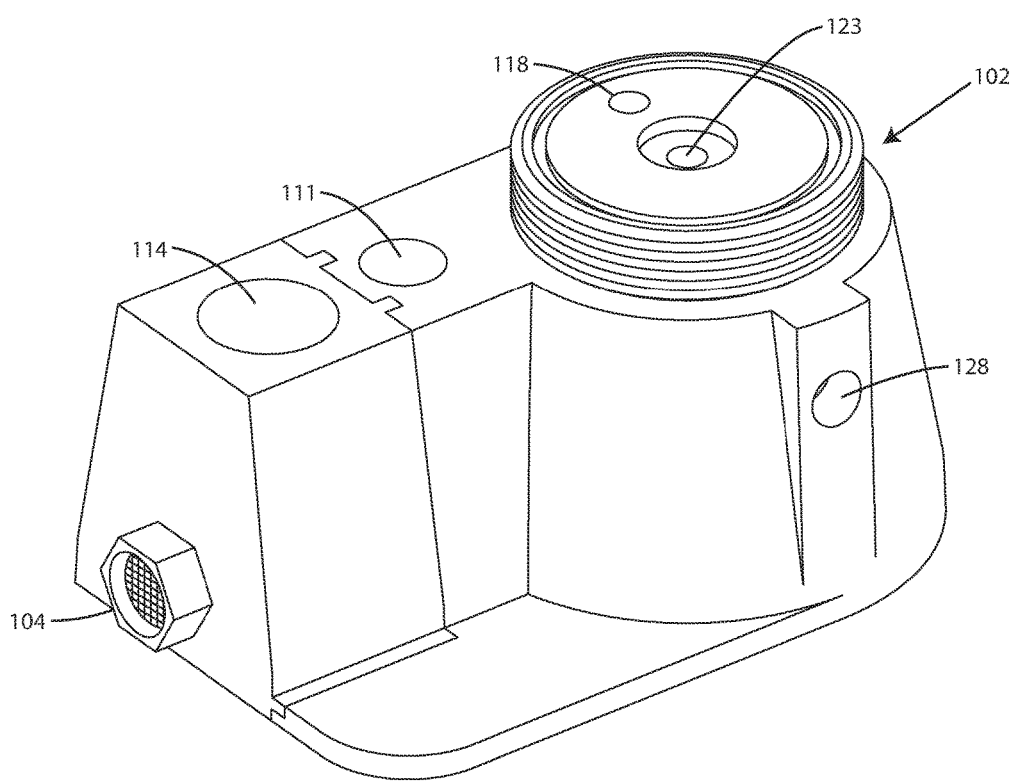
FIG. 3 illustrates a perspective view of an exemplary base for the dual filter pump assembly, in accordance with an embodiment of the present invention.

As illustrated in FIG. 3, a valve access opening 111 may be provided in the base 102 adjacent to the -upper passageway - 118. As illustrated in FIG. 4A, a removable valve cap 107 may be fitted in the valve access opening 111 to facilitate selective access to the lower check valve ball -131, the lower valve seat 133, the upper check valve ball - 119 and the upper valve seat 121 for replacement and/or maintenance purposes.

A pump chamber 112 may extend from the base 102. The pump chamber 112 may have a pump chamber interior 113 (FIGS. 9 and 10), with an intake -hole 114 which is disposed in fluid communication with the middle passageway 110 in the base 102 and a pump end 116 which is opposite the intake - hole 114. A piston rod 134 may be mounted for sliding displacement in the pump chamber interior 113 of the pump chamber 112. The piston rod 134 may have an inner piston rod end 136 which is disposed in the pump chamber interior 113 and an outer piston rod end 138 which extends from the pump chamber interior 113. As illustrated in FIGS. 1 and 2, a handle 140 may terminate the outer piston rod end 138 of the piston rod 134. In typical application of the assembly 100, which will be hereinafter described, the handle 140 may be grasped by a user (not illustrated) to reciprocate the piston rod 134 in the pump chamber interior 113 for purposes which will be hereinafter described.

A seal 117 is used to seal between piston rod 134 and outer piston rod 138.

In some embodiments, a relief valve 130 may be disposed in fluid communication with the pump end 116 of the pump chamber 112. The relief valve 130 may facilitate release of excess fluid pressure in the pump chamber interior 113 of the pump chamber 112 during operation of the assembly 100, as will be hereinafter described. The relief valve 130 has a pull ring 135 that is used to remove air from chamber 113 to help prime the pump.

As illustrated in FIGS. 2 and 4, a micro filter medium 124 may be disposed in fluid communication with the upper passageway 118 in the base 102. In some embodiments, the micro filter medium 124 may be contained inside a filter chamber 122 which may extend from the base 102.

Figure 5:
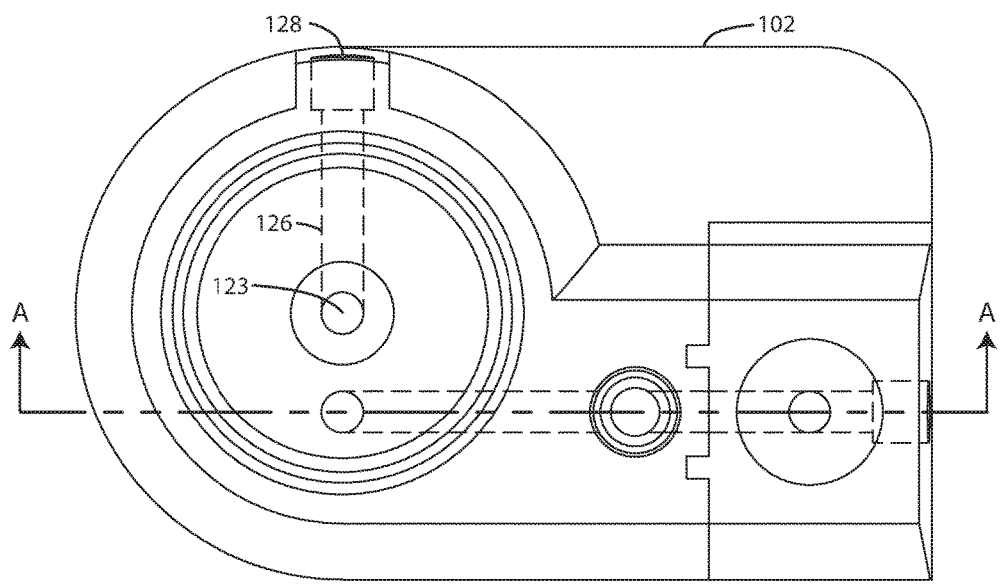
FIG. 5 illustrates a sectioned top view of the dual filter pump assembly, in accordance with an embodiment of the present invention.

As illustrated in FIG. 5, an outlet passageway 126 may be provided in the base 102. The outlet passageway 126 may be disposed in fluid communication with the micro filter medium 124. A base outlet 128 in the base 102 may be disposed in fluid communication with the outlet passageway 126. The base outlet 128 may facilitate dispensing of the filtered water (not illustrated) from the assembly 100. In some embodiments, the base outlet 128 may include a ¼" pipe thread outlet which facilitates coupling of a dispensing conduit (not illustrated) to the base 102.

As will be hereinafter further described, in typical operation, the dual pump filter assembly 100 may initially draw a liquid 150 (FIG. 4A) from the inlet conduit 105 (FIGS. 1 and 2) through the coarse filter medium 106 via negative fluid pressure and then force the liquid 150 through the micro filter medium 124 in the filter chamber 122 via positive fluid pressure to produce potable water. In some embodiments, the assembly 100 may provide a portable, hand-powered vacuum and pressure pump that alternatively creates negative and positive fluid pressures which act together to draw the liquid 150 first through the course filter medium 106 and then through the lower passageway 125 into the middle passageway 110, and then force the liquid 150 from the middle passageway 110 and into and through the upper passageway 118 and the micro filter medium 124, respectively. The liquid 150 may then flow from the micro filter medium 124 through the outlet passageway 126 (FIGS. 5 & 6) and from the base 102 through the base outlet 128.

The lower check valve ball -131 and the upper check valve ball -119 may maintain synchronized communication between the upper passageway 118, the middle passageway 110 and the lower passageway 125 such that there is sufficient pressure and flow regulation to force the liquid 150 through micro-sized pores 127 (FIG. 4B) in the generally flow-restrictive micro filter medium 124. Especially when contaminated, the micro-sized pores 127 in the micro filter medium 124 may be susceptible to inhibiting flow of the liquid 150 through the micro filter medium 124 and consequently generating accumulation of pressure inside the filter chamber 122. In some embodiments, the relief valve 130 may be provided in the pump chamber interior -113 to release excess accumulation of pressure in the filter chamber 122 and the pump chamber interior - 113.

As illustrated in FIG. 1, the dual filter pump assembly 100 may be configured to facilitate flow of the liquid 150 which is to be filtered from a liquid source (not illustrated) and through the coarse filter medium 106 and the micro filter medium 124, respectively, before finally forcibly dispensing the filtered liquid 150 or potable water to a liquid reservoir or other destination (not illustrated). The reciprocating piston rod 134 in the pump chamber 112 may alternatively produce negative and positive fluid pressures which create sufficient pressure and flow regulation for displacement of the liquid 150 through the course filter medium 106 and the micro filter medium 124, which may have micro-sized pores 127 that have a tendency to restrict the passage of the liquid 150.

Use of the coarse filter medium 106 and the micro filter medium 124 by reciprocation of the typically hand-actuated piston rod 134 in the portable assembly 100 is efficacious for producing large quantities of potable water with minimal expense and no need for an electrical power source. The assembly 100 may be portable, lightweight and easy to disassemble for cleaning, and may produce relatively large volumes of potable water. The use of both a course filter medium 106 and a micro filter medium 124 may also engender greater surety about the safety or potability of the filtered liquid.

Note: The middle passageway communicates with the intake hole 114 of pump chamber interior 113. The hole 114 glues to the pump chamber or barrel 112.

As it is reciprocated in the pump chamber interior 113 of the pump chamber 112, the piston rod 134 may alternate between creating a vacuum or negative fluid pressure which initially pulls the liquid 150 through the course filter medium 106 and then through the lower passageway 125 and into the middle passageway 110, and creating positive fluid pressure which then forces the liquid 150 from the middle passageway 110 through the upper passageway 118 and the micro filter medium 124 in the filter chamber 122. The upper check valve ball -119 and the lower check valve ball -131, working in conjunction with the upper valve seat 121 and the lower valve seat 133, respectively, may regulate the directional flow of the liquid 150 responsive to reciprocation of the piston rod 134 in the pump chamber 112. In some embodiments, the upper valve seat 121, the upper check valve ball -119, the lower valve seat 133 and the lower check valve ball -131 may each include stainless steel or ceramic.

Upon upward sliding or extension of the piston rod 134 from the pump chamber interior 113 of the pump chamber 112, as illustrated in FIG. 9, the piston rod 134 initially draws air 152 from the middle passageway 110. Accordingly, the negative fluid pressure created in the middle passageway 110 unseats the lower check valve ball -131 from the lower valve seat 133 and induces negative fluid pressure in the lower passageway 125, drawing the liquid 150 from the inlet conduit 105 through the course filter medium 106 and the lower passageway 125, respectively, into the middle passageway 110. The upper check valve ball -119 remains seated on the upper valve seat 121 to prevent flow of the liquid 150 into the upper passageway 118. Throughout the upstroke of the piston rod 134 in the pump chamber 112, the unseated lower check valve ball -131 allows flow of the liquid 150 from the lower passageway 125 into the middle passageway 110 to sustain the negative fluid pressure in the lower passageway 125.

Upon subsequent - retraction or downward sliding of the piston rod 134 in the pump chamber interior 113 of the pump chamber 112, as illustrated in FIG. 10, the piston rod 134 forces air 152 from the pump chamber interior 113 through the middle passageway 110, where the positive fluid pressure pushes the liquid 150 from the middle passageway 110. Thus, the positive fluid pressure of the flowing liquid 150 seats the lower check valve ball -131 back onto the lower valve seat 133 and simultaneously lifts and unseats the upper check valve ball -119 from the upper valve seat 121. Accordingly, the positive fluid pressure forces the liquid 150 from the middle passageway 110 through the upper passageway 118 and into and through the micro filter medium 124. The micro filter medium 124 filters small particles and microorganisms from the liquid 150 to form filtered liquid 150. The filtered liquid 150 may be discharged from the micro filter medium 124 through the outlet passageway 126 and base outlet 128 (FIG. 5) in the base 102. A suitable dispensing tube (not illustrated) may be coupled to the base outlet 128 and may discharge into a suitable receptacle (not illustrated) which collects the filtered fluid 150.

In operation when priming the pump, initially there is air and liquid in the pump chamber interior 113. Preferably, ring 135 can be pulled simultaneously as rod handle 140 is pushed downwardly to expedite the release of the air from the pump chamber interior 113 thereby expediting the priming function.

One aspect of a dual filter pump assembly 100 for drawing a liquid 150 which is to be filtered through a coarse filter medium 106 and subsequently forcibly pushing the liquid 150 through a micro filter medium 124 may include:
  a base 102 having an inlet 104,
  the base 102 further defined by a lower passageway 125 in fluid communication with the inlet 104,
  the base 102 further defined by a middle passageway 110 in fluid communication with the lower passageway 125,
  the base 102 further defined by a lower check valve 131, the lower check valve 131 configured to open communication between the lower passageway 125 and the middle passageway 110 when negative fluid pressure is induced in the middle passageway 110, the lower check valve 131 further configured to seal communication between the lower passageway 125 and the middle passageway 110 when positive fluid pressure is induced in the middle passageway 110,
  the base 102 further defined by an upper passageway 118 in fluid communication with the middle passageway 110,
  the base 102 further defined by an upper check valve 119, the upper check valve 119 configured to seal communication between the upper passageway 118 and the middle passageway 110 when the positive fluid pressure is induced in the middle passageway 110, the upper check valve 119 further configured to open communication between the upper passageway 118 and the middle passageway 110 when the positive fluid pressure is induced in the middle passageway 110,
  the base 102 further defined by an outlet passageway 126 in communication with the upper passageway 118, fluid passes through micro filter medium 124 between outlet passage way 126 and upper passage way 118,
  a coarse filter medium 106 disposed between and in fluid communication with the inlet 104 and the lower passageway 125,
  a pump chamber interior -113 disposed in fluid communication with the middle passageway 110,
  a piston rod 134 disposed for reciprocation within the pump chamber interior -113,
  wherein the piston rod 134 induces the negative fluid pressure in the middle passageway 110 upon extension of the piston rod 134 from the pump chamber interior -113,
  wherein the piston rod 134 induces the positive fluid pressure in the middle passageway 110 upon - retraction of the piston rod 134 into the pump chamber interior - 113, and
  a micro filter medium 124 defined by a plurality of micro-sized pores 127, the micro filter medium 124 disposed between and in fluid communication with the upper passageway 118 and the outlet passageway 126.

As referenced in FIG. 3, in some embodiments, the assembly 100 may include the base 102. In typical application of the assembly 100, the base 102 may be submersed in a liquid source (not illustrated) which contains a liquid 150 to be filtered to form potable water or other filtered liquid 150. The base 102 may be suitably positioned to efficiently receive the liquid 150. In some applications, the liquid source may include a container of water that is not potable. Those skilled in the art will recognize that the base 102 may maintain a level position at the bottom of the liquid source for optimal displacement of the liquid 150. The base 102 may have any dimensions and sizes suitable for receiving, filtering, and dispensing the liquid 150. In some embodiments, the base 102 may be rectangular in shape and may have a length of about 5.9" and a width of about 3.375". Suitable materials for the base 102 may include, without limitation, a metal, a metal alloy, a rigid polymer, and fiberglass. The inlet 104 may provide an initial entry point for the liquid 150 into the base 102. In some embodiments, the inlet 104 may have a grated barrier to inhibit large debris from passing into the base 102.

As illustrated in FIG. 4A, the lower passageway 125 may be provided in the base 102 in fluid communication with the inlet 104. In some embodiments, the lower passageway 125 may include a cylindrically-shaped channel that passes into an interior region of the base 102. In some embodiments, the assembly 100 may include two different types of filter media 106, 124 having different porosities. For example and without limitation, in some embodiments, the assembly 100 may include the coarse filter medium 106, disposed between the inlet 104 and the lower passageway 125, and the micro filter medium 124, disposed in the filter chamber 122 in fluid communication with the upper passageway 118.

The coarse filter medium 106 may include, for example and without limitation, a pad of spun polypropylene fiber or a stainless steel screen. The coarse filter medium 106 may be configured to remove larger contaminates such as sand granules and insects, for example and without limitation, from the liquid 150 to be filtered- The coarse filter medium 106 is embodied in the hose fitting adapter of conduit 105 which is screwed into the inlet 104 (⅜" NPT)

The lower check valve ball -131 and lower valve seat 133 may be provided in the base 102. The lower check valve ball-131 may unseat from the lower valve seat 133 to establish communication between the lower passageway 125 and the middle passageway 110 upon inducement of the negative fluid pressure in the middle passageway 110 typically responsive to upward extension or movement of the piston rod 134 in the pump chamber interior 113 of the pump chamber 112. The lower check valve ball -131 may further be configured to seat against the lower valve seat 133 and seal communication between the lower passageway 125 and the middle passageway 110 as the liquid 150 to be filtered is forced from the middle passageway 110 into and through the upper passageway 118.

Figure 6:
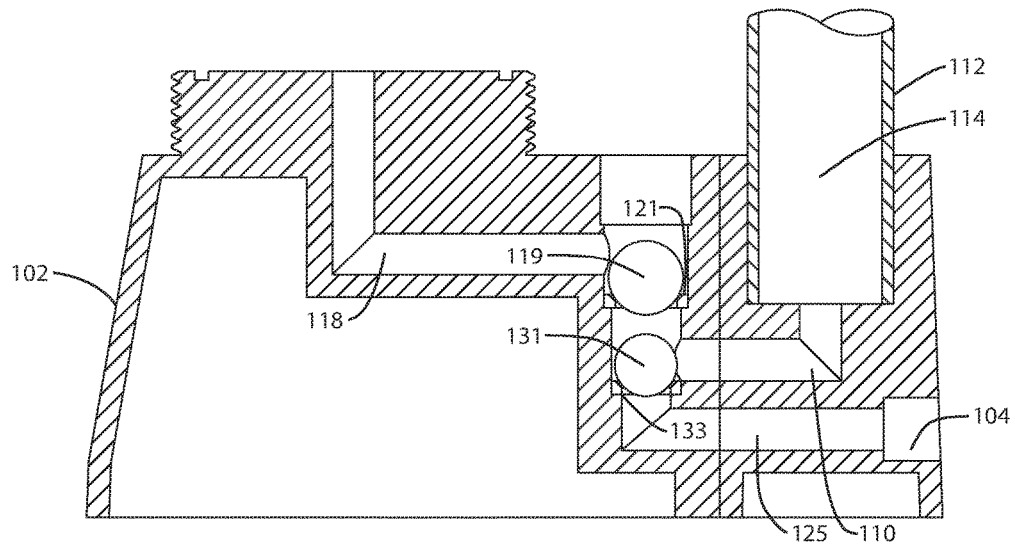
FIG. 6 illustrates a sectioned side view of the dual filter pump assembly, the section taken along section A-A of FIG. 5, detailing the base, in accordance with an embodiment of the present invention.
Figure 7:
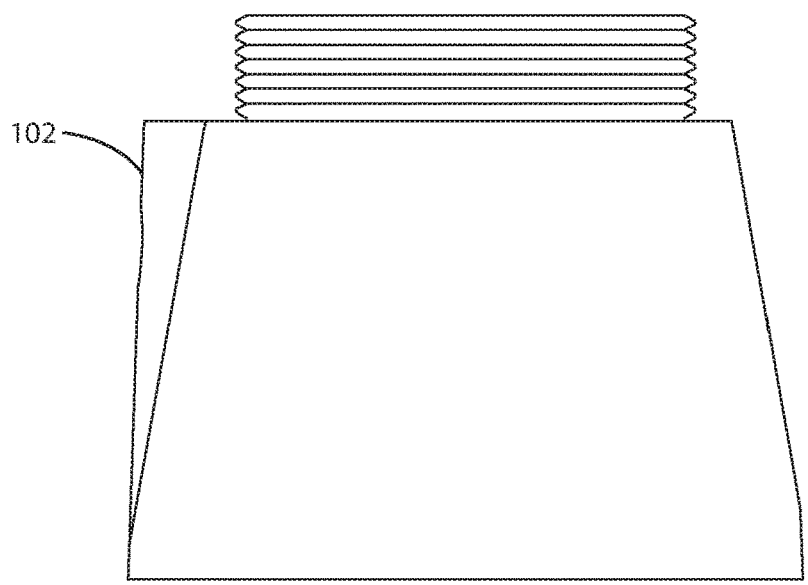
FIG. 7 illustrates an elevated- left side view of the base, in accordance with an embodiment of the present invention.
Figure 8:
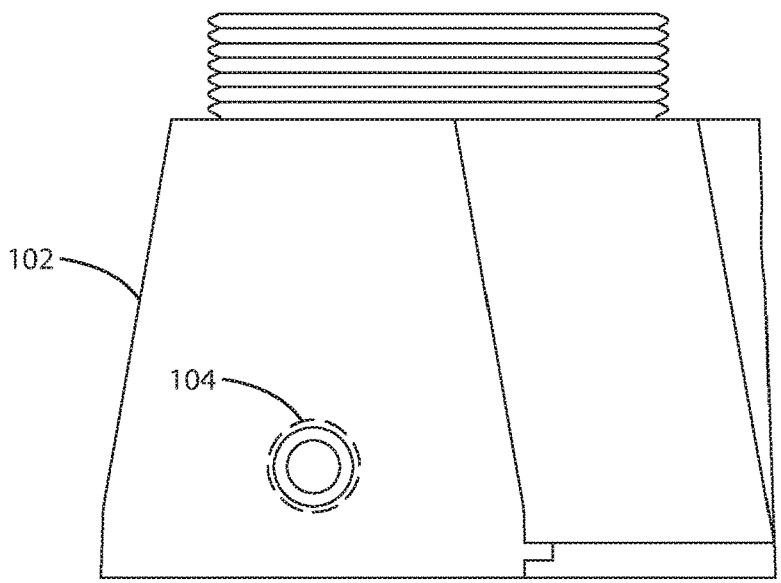
FIG. 8 illustrates an elevated right side view of the base, detailing the inlet port, in accordance with an embodiment of the present invention.

As illustrated in FIG. 6, the base 102 may further include the upper passageway 118 that is disposed in fluid communication with the middle passageway 110. The upper passageway 118 may include a cylindrically-shaped channel positioned above the middle passageway 110 in the base 102. As illustrated in FIG. 5, the base 102 may further include an outlet passageway 126 which is disposed in fluid communication with the upper passageway 118 through the micro filter medium 124 and through which the filtered liquid 150 flows out of the base 102. In some embodiments, the outlet passageway 126 may be about ¼" in diameter and may attach to a base outlet 128 which connects to a dispensing hose (not illustrated). In some embodiments, the base outlet 128 may include a ¼" pipe thread outlet.

As further illustrated in FIG. 4A, the upper check valve ball- 119 and upper valve seat 121 may be provided in the base 102. The upper check valve ball - 119 may be configured to normally seat by gravity and by suction force against the upper valve seat 121 and seal communication between the upper passageway 118 and the middle passageway 110 when the piston rod 134 establishes and sustains negative fluid pressure in the lower passageway 125 through the middle passageway 110. The upper check valve - 119 may further be configured to unseat from the upper valve seat 121 and establish communication between the upper passageway 118 and the middle passageway 110 when the piston rod 134 establishes and sustains positive fluid pressure which forces the liquid 150 to be filtered from the middle passageway 110 into the upper passageway 118. In some embodiments, the valve cap 107 may be removed from the housing 102 to facilitate access to the lower check valve ball 131, the lower valve seat 133, the upper check valve ball 119 and the upper valve seat 121 for inspection, cleaning and/or maintenance purposes.

As further illustrated in FIG. 2, the assembly 100 may further include the pump chamber 112. The pump chamber 112 may include a pump chamber sidewall (not numbered) having an intake - hole 114 and a pump end 116. The pump chamber 112 may be disposed above the base 102. In some embodiments, a 1.312" opening (not illustrated) may form a junction between the pump chamber interior 113 of the pump chamber 112 and the middle passageway 110. In some embodiments, the pump chamber 112 may be glued or otherwise fixedly attached to the base 102. In other embodiments, the pump chamber 112 may be fabricated in one piece with the base 102 using molding or other techniques known by those skilled in the art.

The intake -hole 114 of the pump chamber 112 is disposed in communication with the middle passageway 110. Thus, during extension of the piston rod 134 from the pump chamber interior 113, some liquid 150 may enter the pump chamber interior 113 from the middle passageway 110 through the intake -hole 114 and exit the pump chamber 112 through the pump end 116. Accordingly, the relief valve 130 in the pump end 116 may facilitate discharge of the liquid 150 from the pump chamber interior 113. In some embodiments, the sidewall of the pump chamber 112 may be a generally cylindrical shape. The sidewall may be transparent to enable viewing of the liquid 150 as it enters and exits the pump chamber 112.

In some embodiments, the assembly 100 may further include the piston rod 134 that is disposed for reciprocation within the pump chamber interior 113 of the pump chamber 112 to displace the liquid 150 through the coarse filter medium 106 and the micro filter medium 124. Accordingly, the reciprocating piston rod 134 may induce and sustain the negative fluid pressure or vacuum which draws the liquid 150 from the lower passageway 125 into the middle passageway 110 and the positive fluid pressure which forces the liquid 150 from the middle passageway 110 into the upper passageway 118, as described above. The piston rod 134 may include an inner piston rod end 136 which is disposed within the pump chamber interior 113 and an outer piston rod end 138 which is disposed outside the pump chamber interior 113. A handle 140 may terminate the outer piston rod end 138 to facilitate manual gripping and reciprocation of the piston rod 134 in the pump chamber interior 113.

The piston rod 134 and the pump chamber 112 may have a common longitudinal axis. The outer piston rod end 138 of the piston rod 134 may extend through a fluid seal 117 (not shown) at the pump end 116 of the pump chamber 112. The handle 140 may be attached to the outer piston rod end 138 to facilitate gripping and effecting reciprocation of the piston rod 134 within the pump chamber interior 113 of the pump chamber 112 along the longitudinal axis.

As set forth above, in some embodiments, the piston rod 134 may induce a vacuum or negative fluid pressure in the middle passageway 110 upon an upstroke or upward movement or extension of the handle 140 away from the pump chamber 112. Conversely, the piston rod 134 may induce positive fluid pressure in the middle passageway 110 upon a down stroke or downward movement of the handle 140 towards the pump chamber 112. The negative fluid pressure may draw the liquid 150 to be filtered from the lower passageway 125 into the middle passageway 110. The positive fluid pressure may force the liquid 150 to be filtered from the middle passageway 110 into and through the upper passageway 118. In some embodiments, the reciprocating movement of the piston rod 134 may be actuated manually to eliminate the requirement of a power source. In other embodiments, the piston rod 134 may be actuated using a mechanical actuation device according to the knowledge of those skilled in the art. In some embodiments, the various components of the filter pump assembly 100 may be sized in such a manner that a single up-and-down stroke of the piston rod 134 produces approximately 6 fluid ounces of potable water or other filtered liquid 150.

The assembly 100 may further include the filter chamber 122. The filter chamber 122 may extend upwardly from the base 102 and may include a filter sidewall (not numbered), an open filter end 146 with an O-ring seal (not illustrated), and a closed filter end 144. The filter chamber 122 may be disposed adjacent to the pump chamber 112. The open filter end 146 of the filter chamber 122 may be disposed in fluid communication with the upper passageway 118, and the outlet passageway 126 (FIGS. 5 and 6) in the base 102 may be disposed in fluid communication with the open filter end 146. As illustrated in FIG. 4A, in some embodiments, a ¼" BSPP female filter thread 123 may attach -to the micro filter media 124 and to the base 102.

In typical operation of the assembly 100, the liquid 150 which is being filtered may enter the filter chamber 122 from the upper passageway 118 and exit the - filter 124 through filter thread 123 the outlet passageway 126 and through the typically ¼" base outlet 128 (FIG. 5), respectively. In some embodiments, the sidewall of the filter chamber 122 may be generally cylindrical. The sidewall of the filter chamber 122 may be sealed with an O-ring (not illustrated) to the base 102 in order to prevent air or liquid loss -

Figure 4B:
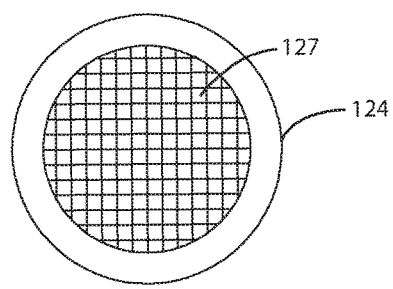
FIG. 4B illustrates an enlarged sectioned view of a typical micro filter medium having micro sized pores.

As illustrated in FIG. 4A, the micro filter medium 124 may be disposed inside and may share the same longitudinal axis as the filter chamber 122. As illustrated in FIG. 4B, the micro filter medium 124 may include a plurality of micro-sized pores 127. The micro-sized pores 127 may tend to at least partially inhibit flow of the liquid 150 as it passes through the filter chamber 122 during filtration. In some embodiments, - 13.3 pounds @ 30 PSI, or -26.5 pounds @ 60 PSI may be required to push the liquid 150 through the micro filter medium 124.

Inhibition of the liquid flow may generate positive fluid pressure inside the filter chamber 122. Additionally, under conditions in which the micro filter medium 124 is contaminated, accumulation of pressure may occur as flow of the liquid 150 through the fluid chamber is restricted. In some embodiments, the micro filter medium 124 may include a ceramic filter with micro sized pores 127 sized at 1 micron. In other embodiments, the micro filter medium 124 may include, without limitation, a ceramic filter, a carbon-based filter, and a nano-membrane material.

The accumulation of pressure inside the filter chamber 122 may at least partially assist in displacement of the liquid 150 to the outlet passageway 126. Excessive pressure may, however, not be desirable. For example, in the event that the maximum pressure that the micro filter medium 124 can structurally withstand is one hundred and twenty-five pounds or some other limit, the assembly 100 may utilize the relief valve 130 to release excess pressure that forms inside the filter chamber 122, the pump chamber 112 and the middle passageway 110 and the upper passageway 118, as needed.

In some embodiments, the relief valve 130 may indicate that the micro filter medium 124 requires cleaning, such as when the liquid 150 accumulates and backs up in the pump chamber 112 and exits a relief port (not illustrated) in the relief valve 130. The relief valve 130 may be positioned in a threaded area of the pump end 116 and in fluid communication with the pump chamber interior -113, the upper passageway 118 and the filter chamber 122. In some embodiments, the relief valve 130 may be rated at 80 PSI.

A typically ¼" base outlet 128 (FIG. 5) may be disposed in communication with the outlet passageway 126 to facilitate coupling of a dispensing hose (not illustrated) which carries the filtered liquid 150 away from the assembly 100. In applications in which the filtered liquid 150 is water, the water which exits the assembly 100 may be potable. In some embodiments, the dispensing hose may include a rubber tube that is sized and dimensioned to efficiently carry the filtered liquid 150 to a liquid reservoir (not illustrated).

Figure 11:
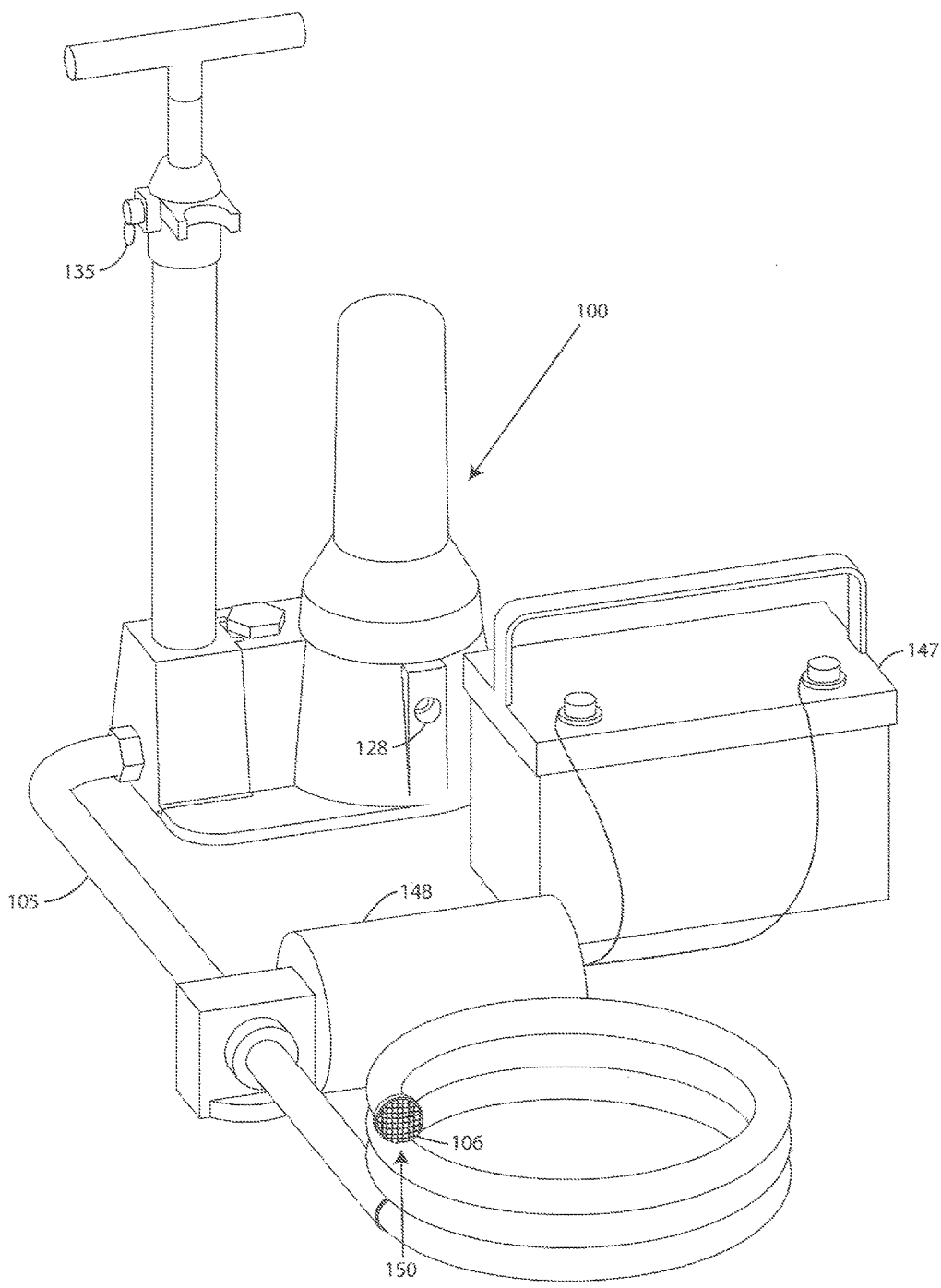
FIG. 11 illustrates a perspective view of an exemplary dual filter pump assembly having an electric pump powered by a battery, in accordance with an embodiment of the present invention.

In some embodiments, as illustrated in FIG. 11, dual filter pump assembly 100 may include an electric pump 148, powered by battery 147, typically a 12 volt DC battery but other batteries such as a 24 volt DC battery could be used. Alternatively pump 148 could be an 110 volt AC pump. In operation, electric pump 148 sucks liquid 150 through 106 screen and pressurizes the liquid 150 in the inlet conduit 105. The liquid 150 is pushed through open check valve 131 (FIG. 2) and filter 124 (FIG. 2) and out outlet 128 as if pumping by hand.

One objective of the present invention is to provide a hand-operated vacuum and pressure pump for transferring a non-potable liquid through two different types of filters to produce potable water.

Another objective is to create sufficient pressure so as to force the liquid through a micro filter medium 124, such as a ceramic filter.

Yet another objective is to produce up to 600 gallons of potable water from a fresh water source, even if the fresh water source is brackish or muddy. The micro filter can be cleaned.

Yet another objective is to provide a relief valve 130 to release excess pressure from the- pump chamber interior-113 through a relief valve 130.

Yet another objective is to provide a relief valve 130 that provides an indication that the micro filter medium 124 requires cleaning, such as in the event that the liquid which is being filtered exits a relief port in the relief valve.

Yet another objective is to provide a pump having an indicator which indicates that the micro filter medium 124 requires cleaning, such as by water exiting the relief valve.

Yet another objective is to provide a pull ring on the relief valve to facilitate priming of the pump.

Yet another objective is to enable easy disassembly of the assembly 100 for cleaning.

Yet another objective is to provide a portable dual filter pump assembly 100.

Yet another objective is to provide a water filter that may not require electrical power to operate.

Yet another objective is being able to attach an inlet conduit 105 to the base 102 at a threaded area-⅜" NPT - 104 to be able to obtain water from a source at a distance from the pump.

Yet another objective is being able to remove the typically threaded valve cap 107 and typically stainless steel lower check valve ball -131 and upper check valve ball -119 for cleaning.

Yet another objective is to provide a dual filter pump assembly 100 that is inexpensive to manufacture and easy to operate.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A dual filter pump assembly for drawing a liquid through a coarse filter medium and forcibly pushing the liquid through a micro filter medium, the assembly comprising:
   a base having a first base end, a second base end and an inlet,
   the base further defined by a lower passageway in fluid communication with the inlet,
   the base further defined by a middle passageway in fluid communication with the lower passageway,
   the base further defined by a lower check valve, the lower check valve configured to open communication between the lower passageway and the middle passageway when negative fluid pressure is induced in the middle passageway, the lower check valve further configured to seal communication between the lower passageway and the middle passageway when positive fluid pressure is induced in the middle passageway,
   the base further defined by an upper passageway in fluid communication with the middle passageway,
   the base further defined by an upper check valve, the upper check valve configured to seal communication between the upper passageway and the middle passageway when the negative fluid pressure is induced in the middle passageway, the upper check valve further configured to open communication between the upper passageway and the middle passageway when the positive fluid pressure is induced in the middle passageway,
   the base further defined by an outlet passageway in communication with the upper passageway,
   a coarse filter medium disposed between and in fluid communication with the inlet and the lower passageway,
   a pump chamber disposed in fluid communication with the middle passageway at the first base end,
   a piston rod disposed for reciprocation within the pump chamber,
   wherein the piston rod induces the negative fluid pressure in the middle passageway upon extension of the piston rod from the pump chamber,
   wherein the piston rod induces the positive fluid pressure in the middle passageway upon extension of the piston rod into the pump chamber,
   a micro filter medium defined by a plurality of micro-sized pores at the second base end, the micro filter medium disposed between and in fluid communication with the upper passageway and the outlet passageway,
   a valve access opening provided in the base adjacent to the middle passageway between the pump chamber and the micro filter medium, and
   a removable valve cap fitted in the valve access opening to facilitate selective access to the lower check valve and the upper check valve, the lower check valve and the upper check valve both accessible through the valve access opening.

2. The assembly of claim 1, wherein the micro filter medium comprises a ceramic filter.

3. The assembly of claim 1, wherein the coarse filter medium comprises a pad of spun polypropylene fiber.

4. The assembly of claim 1, wherein the lower check valve comprises a lower valve seat and a lower check valve ball normally engaging the lower valve seat.

5. The assembly of claim 1, wherein the upper check valve comprises an upper valve seat and an upper check valve ball normally engaging the upper valve seat.

6. The assembly of claim 1, further comprising a base outlet disposed in fluid communication with the outlet passageway.

7. The assembly of claim 1, further comprising a filter chamber upward-standing from the base and wherein the micro filter medium is disposed in the filter chamber.

8. The assembly of claim 1, further comprising a course filter cavity in the base and wherein the course filter medium is disposed in the course filter cavity.

9. A dual filter pump assembly for drawing a liquid through a coarse filter medium and forcibly pushing the liquid through a micro filter medium, the assembly comprising:
   a base having a first base end, a second base end and an inlet,
   the base further defined by a lower passageway in fluid communication with the inlet,
   the base further defined by a middle passageway in fluid communication with the lower passageway,
   the base further defined by a lower check valve, the lower check valve configured to open communication between the lower passageway and the middle passageway when negative fluid pressure is induced in the middle passageway, the lower check valve further configured to seal communication between the lower passageway and the middle passageway when positive fluid pressure is induced in the middle passageway,
   the base further defined by an upper passageway in fluid communication with the middle passageway,
   the base further defined by an upper check valve, the upper check valve configured to seal communication between the upper passageway and the middle passageway when the negative fluid pressure is induced in the middle passageway, the upper check valve further configured to open communication between the upper passageway and the middle passageway when the positive fluid pressure is induced in the middle passageway,
   the base further defined by an outlet passageway in communication with the upper passageway,
   a coarse filter medium disposed between and in fluid communication with the inlet and the lower passageway,
   a pump chamber disposed in fluid communication with the middle passageway at the first base end, the pump chamber having an intake end disposed in fluid communication with the middle passageway and a pump end opposite the intake end,
   a relief valve disposed in fluid communication with the pump end of the pump chamber,
   a piston rod disposed for reciprocation within the pump chamber, the piston rod having an inner piston rod end disposed in the pump chamber and an outer piston rod end disposed outside the pump chamber,
   a handle on the outer piston rod end,
   wherein the piston rod induces the negative fluid pressure in the middle passageway upon extension of the piston rod from the pump chamber,
   wherein the piston rod induces the positive fluid pressure in the middle passageway upon extension of the piston rod into the pump chamber,
   a micro filter medium defined by a plurality of micro-sized pores at the second base end, the micro filter medium disposed between and in fluid communication with the upper passageway and the outlet passageway,
   a base outlet in the base, the base outlet disposed in fluid communication with the outlet passageway, a valve access opening provided in the base adjacent to the middle passageway between the pump chamber and the micro filter medium, and a removable valve cap fitted in the valve access opening to facilitate selective access to the lower check valve and the upper check valve, the lower check valve and the upper check valve both accessible through the valve access opening.

10. The assembly of claim 9, wherein the micro filter medium comprises a ceramic filter.

11. The assembly of claim 9, wherein the coarse filter medium comprises a pad of spun polypropylene fiber.

12. The assembly of claim 9, wherein the lower check valve comprises a lower valve seat and a lower check valve ball normally engaging the lower valve seat.

13. The assembly of claim 9, wherein the upper check valve comprises an upper valve seat and an upper check valve ball normally engaging the upper valve seat.

14. The assembly of claim 9, further comprising a filter chamber upward-standing from the base and wherein the micro filter medium is disposed in the filter chamber.

15. The assembly of claim 9, further comprising a course filter cavity in the base and wherein the course filter medium is disposed in the course filter cavity.

16. A dual filter pump assembly for drawing a liquid through a coarse filter medium and forcibly pushing the liquid through a micro filter medium, the assembly comprising:

a base having a first base end, a second base end and an inlet, the base further defined by a lower passageway in fluid communication with the inlet, the base further defined by a middle passageway in fluid communication with the lower passageway, the base further defined by a lower check valve, the lower check valve configured to open communication between the lower passageway and the middle passageway when negative fluid pressure is induced in the middle passageway, the lower check valve further configured to seal communication between the lower passageway and the middle passageway when positive fluid pressure is induced in the middle passageway, the lower check valve comprises a lower valve seat and a lower check valve ball normally engaging the lower valve seat, the upper check valve comprises an upper valve seat and an upper check valve ball normally engaging the upper valve seat, the base further defined by an upper passageway in fluid communication with the middle passageway, the base further defined by an upper check valve, the upper check valve configured to seal communication between the upper passageway and the middle passageway when the negative fluid pressure is induced in the middle passageway, the upper check valve further configured to open communication between the upper passageway and the middle passageway when the positive fluid pressure is induced in the middle passageway, the base further defined by an outlet passageway in communication with the upper passageway, a coarse filter medium disposed between and in fluid communication with the inlet and the lower passageway, the coarse filter medium comprises a pad of spun polypropylene fiber, a pump chamber disposed in fluid communication with the middle passageway at the first base end, the pump chamber having an intake end disposed in fluid communication with the middle passageway and a pump end opposite the intake end, a relief valve disposed in fluid communication with the pump end of the pump chamber, a piston rod disposed for reciprocation within the pump chamber, the piston rod having an inner piston rod end disposed in the pump chamber and an outer piston rod end disposed outside the pump chamber, a handle on the outer piston rod end, wherein the piston rod induces the negative fluid pressure in the middle passageway upon extension of the piston rod from the pump chamber, wherein the piston rod induces the positive fluid pressure in the middle passageway upon extension of the piston rod into the pump chamber, a micro filter medium defined by a plurality of micro-sized pores at the second base end, the micro filter medium disposed between and in fluid communication with the upper passageway and the outlet passageway, the micro filter medium comprises a ceramic filter, a valve access opening provided in the base adjacent to the middle passageway between the pump chamber and the micro filter medium, a removable valve cap fitted in the valve access opening to facilitate selective access to the lower check valve ball and the lower valve seat of the lower check valve and the upper check valve ball and the upper valve seat of the upper check valve, the lower check valve ball, the lower valve seat, the upper check valve ball and the upper valve seat all accessible through the valve access opening, and a base outlet in the base, the base outlet disposed in fluid communication with the outlet passageway.

17. The assembly of claim 16, further comprising a filter chamber upward-standing from the base and wherein the micro filter medium is disposed in the filter chamber.

18. The assembly of claim 16, further comprising a course filter cavity in the base and wherein the course filter medium is disposed in the course filter cavity.

* * * * *